United States Patent Office.

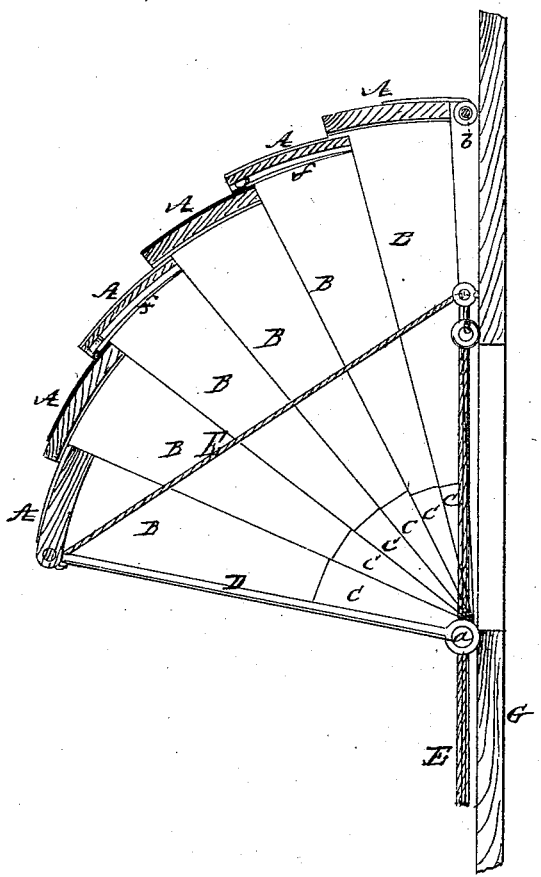

THOMAS G. TYLER, OF NEW YORK, N. Y.

Letters Patent No. 82,569, dated September 29, 1868.

IMPROVED AWNING.

The Schedule referred to in these Letters Patent and making part of the same.

TO ALL WHOM IT MAY CONCERN:

Be it known that I, THOMAS G. TYLER, of New York, in the county of New York, and State of New York, have invented a new and useful Improvement in Awnings; and I do hereby declare that the following is a full, clear, and exact description thereof, which will enable others skilled in the art to make and use the same, reference being had to the accompanying drawings, forming part of this specification, in which—

Figure 1 is a front view of my invention when the same is raised.

Figure 2 is a cross-section of the same through the line $x$ $x$, showing it spread to form an awning.

Similar letters of reference indicate like parts.

The object of this invention is to provide an improved form of awning, which is portable, durable, and easily operated.

It consists, in general terms, of a system of frames, each of which is composed of a rectangular front slat or board affixed to two tapered side slats, with points of the side slats of each frame pivoted to a common centre.

Each frame is successively smaller than the other, so that they will pass one within the other successively, when the apparatus is raised, thus bringing it in a small compass suitable for portability.

It is provided with stay-rods, halyards, and other devices, perfecting the whole, as is hereinafter more fully set forth.

In the drawings, A are the front slats, and B the tapered side slats of each frame, and the said frames are arranged to slide one within the other, with the smallest frame at the bottom, when the apparatus is set, so as to shed the rain in a manner similar to weather-boarding.

The points of the side slats fit into metal sockets, C, having eyes, through which latter the pivot or hinge-rods $a$ pass, as shown.

These rods are supported by eye-bolts $d$, which, projecting from the wall of the house, hold the rod clear of the said wall, so that the eyes of the sockets may work freely in the act of raising or lowering the awning.

D are rods or braces, preferably of iron, the outer ends of which are affixed to the inner frame, while the other ends are formed with eye-bolts, working in bolts held from the wall similarly to side slats.

The outer frame is held to the wall by a rod, $b$, passing through eye-bolts in the wall, and through similar devices on the proximate edges of the front slat of the upper frame.

The several frames are connected together by means of plates bearing headed studs, which work in slotted plates affixed on the adjacent slat shown at $f$.

The frames are raised by means of halyards, E, attached to the lower frame, and leading upward through eyes or pulleys affixed on the wall G, and thence downward, to be conveniently accessible, as shown.

The frames are raised to the position shown in the drawing by simply hauling upon the halyards. The frames will act to spread and form a shed or awning by their own weight.

Having thus described my invention, I claim as new, and desire to secure by Letters Patent—

The awning, having its side slats B and curved top slats A connected together, to form frames, adapted to slide one within the other, by means of the slotted plates $f$, and the plates having headed bolts, substantially as herein shown and described.

The above specification of my invention signed by me, this 23d day of July, 1868.

THOS. G. TYLER.

Witnesses:
  FRANK BLOCKLEY,
  ALEX. F. ROBERTS.